US005606415A

United States Patent [19]
Doty

[11] Patent Number: 5,606,415
[45] Date of Patent: Feb. 25, 1997

[54] FIBER OPTIC GYRO WITH REDUCED READOUT REFLECTION COUPLING CHARACTERISTICS

[75] Inventor: James H. Doty, Cedar Rapids, Iowa

[73] Assignee: Rockwell International, Seal Beach, Calif.

[21] Appl. No.: 312,242

[22] Filed: Sep. 23, 1994

[51] Int. Cl.⁶ .............................. G01C 19/64; G01B 9/02
[52] U.S. Cl. ............................. 356/350; 250/227.24
[58] Field of Search ................... 356/350; 250/227.24, 250/227.25

[56] References Cited

U.S. PATENT DOCUMENTS

| | | | |
|---|---|---|---|
| 4,529,313 | 7/1985 | Petermann et al. | 356/350 |
| 5,153,676 | 10/1992 | Bergh | 356/350 |
| 5,221,839 | 6/1993 | Braun | 250/227.24 |
| 5,252,823 | 10/1993 | Doty | 250/227.24 |
| 5,365,339 | 11/1994 | Nishiura et al. | 356/350 |
| 5,436,728 | 7/1995 | Watanabe | 356/431 |

Primary Examiner—Vincent P. McGraw
Attorney, Agent, or Firm—Gregory G. Williams; M. Lee Murrah; George A. Montanye

[57] ABSTRACT

A FOG design is disclosed that eliminates the need for spatially averaging the output of a readout optical fiber by using a short coherence length light source and decorrelating the orthogonal fiber modes in the birefringent readout optical fiber prior to them being received by the photodetector. The orientation of the optical output of the readout optical fiber with respect to the photodetector is at an angle other than normal incidence, which is designed to reduce the reflections from the photodetector back into the readout optical fiber. The coherence length of the source and the length and birefringence of the readout optical fiber are selected so that there is a complete decorrelation of the polarization states of the light as they pass through the readout optical fiber.

6 Claims, 3 Drawing Sheets

FIBER OPTIC GYRO WITH REDUCED READOUT REFLECTION COUPLING CHARACTERISTICS

FIELD OF THE INVENTION

The present invention generally relates to fiber optic gyros (FOGs).

In recent years FOGs are achieving increased success. However, one problem common to many FOGs is readout errors associated with optical inteference at the readout photodetector. One solution to this problem has been spatially average the entire output of light from the optical fiber, thereby cancelling any optical interference effects. Such a solution is described in U.S. Pat. No. 5,153,676 entitled, "Apparatus And Method For Reducing Phase Errors in An Interferometer", issued to Ralph A. Bergh on Oct. 6, 1992, which patent is hereby incorporated herein in its entirety by this reference.

While the Bergh approach does help reduce some phase errors due to optical interference at the readout photodetector, it utilizes a design that requires the fiber to be cleaved or polished normal to its length and the photodetector must be mounted with its face normal to the output of the fiber. Reflection occurs both at the fiber/air interface and at the air/photodetector interface. Because both of these surfaces are normal to the propagation of light, the reflected light will tend to couple back into the fiber. The fiber and the photodetector form a Fabry-Perot cavity (resonant optical cavity between two reflective surfaces) the amount of reflected light will vary significantly and is extremely sensitive to the distance between the photodetector and the fiber. These varying reflections can cause significant variations in the FOG output.

Consequently, there exists a need for improvement in FOGs which reduce the errors associated with optical interference at the readout photodetector while concomitantly reducing the errors associated with reflection from the readout photodetector back into the optical fiber.

SUMMARY OF THE INVENTION

It is an object of the present invention to reduce errors associated with back reflection from a readout photodetector into the optical fiber.

It is a feature of the present invention to provide a readout photodetector which is oriented at a non-normal angle with respect to the light exiting the output fiber.

It is an advantage of the present invention to reduce the errors associated with coupling reflections off the readout photodetector back into the optical fiber.

It is another object of the present invention to reduce errors associated with optical interference at the readout photodetector.

It is another feature of the present invention to include a short coherence length light source which is sufficiently short so that a decorrelation of polarization modes in the last leg of the optical fiber before the readout photodetector is sufficient to completely decorrelate the polarization modes in that segment.

It is another advantage of the present invention to provide for a decorrelation of the polarization states in the optical fiber at the readout photodetector.

The present invention provides a FOG which is designed to satisfy the aforementioned needs, include the above described objects, contain the earlier articulated features, and provide the previously stated advantages. The invention is carried out in a "back reflection-less" system in the sense that the back reflections off of the readout photodetector back into the optical fiber have been greatly reduced. Additionally, the invention is carried out in a "readout optical interference-less" system in the sense that the typical optical interference occurring at the readout photodetector is significantly reduced.

Accordingly, the present invention includes a FOG having a light source with a short coherent length such that a decorrelation of the polarization states occur in the last leg of optical fiber immediately before the readout photodetector which is oriented at a non-normal angle with respect to the light exiting the output optical fiber.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
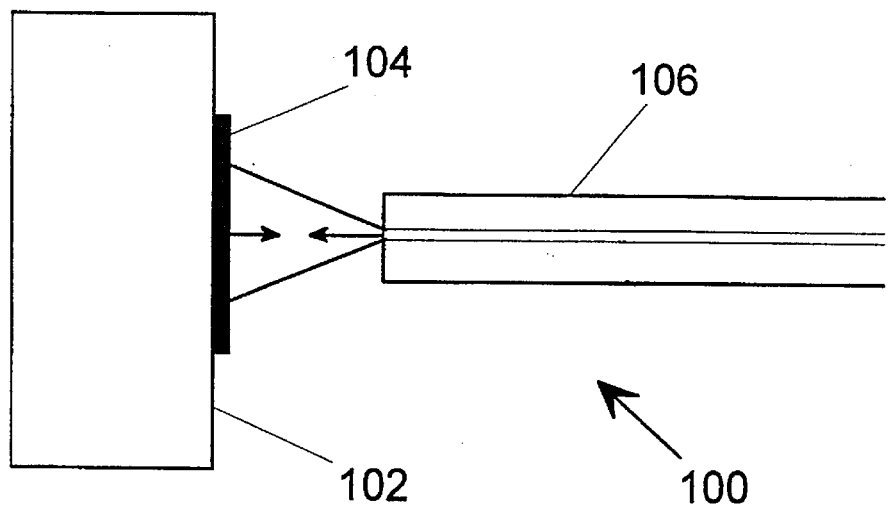
FIG. 1 is a cross sectional representation of a optical fiber/readout photodetector combination, of the prior art, which shows the optical fiber being positioned normal to the photodetector face.

Now referring to the drawings, wherein like numerals refer to like text and matter throughout, and more particularly referring now to FIG. 1 there is shown a FOG readout, of the prior art, generally designated 100, having a photo detector 102 with a photodetector face 104 thereon. Also shown is optical fiber 106 which is disposed at normal incidents with respect to the photodetector face 104. It can be seen that some of the light emitting from fiber 106 would be incident upon the photodetector face 104 and then be reflected back into the optical fiber 106.

Figure 2:
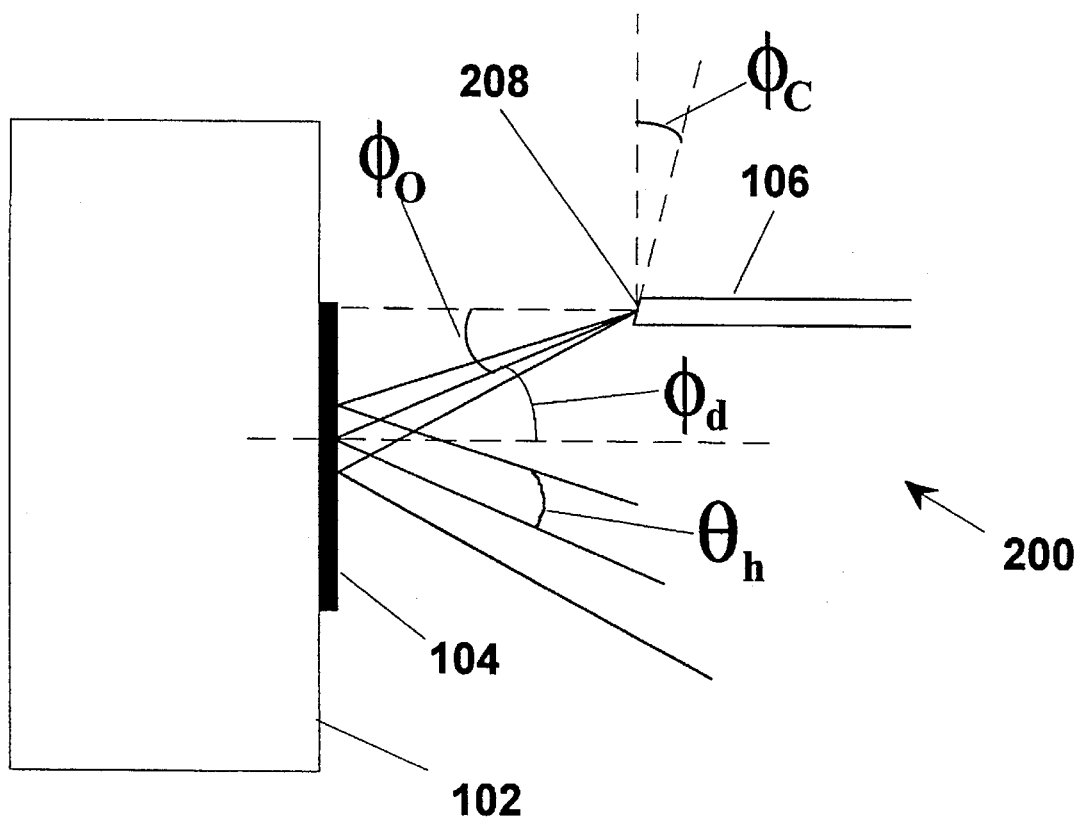
FIG. 2 is a representation of the readout photodetector/ optical fiber configuration, of the present invention, which shows the photodetector being positioned at a non-normal angle with respect to the output of the optical fiber.

Now referring to FIG. 2, there is shown a FOG readout, of the present invention, generally designated 200, having a readout photodetector 102 with a photodetector face 104 thereon. Also shown is an optical fiber 106 having a cleaved end 208 which is at a non-normal angle with respect to the axis of the fiber 106. The output face of the readout fiber 208 is cleaved or polished at an angle $\phi_c$ from normal to the length of the readout fiber 106. The output light exiting the fiber will be refracted according to Snell's Law by the angle $\phi_o$ given by:

$$\phi_o = \arcsin \frac{n_f}{n_o} \cdot \sin \phi_c$$

where $n_f$ is the optical index of the fiber, and $n_o$ is the optical index of the material outside of the fiber. In the preferred embodiment of this invention $\phi_c$ is approximately 15 degrees, the optical index of glass optical fibers is near 1.5, and air, vacuum, or inert gas with index of 1.0 surrounds the fiber. So the angle $\phi_o$ between the axis of the output light cone and the length of the readout fiber is approximately 23 degrees. At the cleave angle of 15 degrees reflections at the fiber air interface are not coupled back into the fiber. The light exiting the end of the readout fiber expands in a cone having an pseudo-Gaussian distribution with angle. The characteristic cone half angle $\theta_h$ is given by:

$$\theta_h \approx \frac{1}{2} \cdot \frac{\lambda}{D_{EMF}}$$

where $\lambda$ is the wavelength of light, and $D_{EMF}$ is the effective mode field diameter of the light exiting the fiber at the cleave angle given by:

$$D_{EMF} = D_{FMF} \cdot \cos(\phi_o)$$

where $D_{FMF}$ is the mode field diameter of light in the fiber. At angles greater than $\theta_h$ there is little optical energy. To ensure that light reflected from the face of the photodetector is not coupled back into the fiber the angle $\theta_d$ between the light exiting the fiber and the normal to the photodetector face must be adequately greater than the optical output half angle $\theta_h$. In the preferred embodiment of the invention a fiber with a mode field diameter of approximately 5 microns and a source wavelength $\lambda$ of approximately 850 nm are used giving a $\theta_h$ value of about 5 degrees. The photodetector is mounted with its face approximately normal to the length of the readout fiber such that $\phi_d = \phi_0$ or 23 degrees which is much larger than $\theta_h$ so that no significant amount of the reflected light is coupled back into the readout fiber.

The reflection coefficient from any dielectric surface such as the face of the photodetector is a function of both angle and the polarization state of the incident light. The fraction of the light energy transmitted into the photodetector, and therefore detectable, is given by:

$$T_s(\phi_d) = 1 - \left( \frac{-\sin(\phi_d - \theta(\phi_d))}{\sin(\phi_d + \theta(\phi_d))} \right)^2$$

for light with its polarization axis perpendicular to the surface of the photodetector, known as the s wave, and by:

$$T_p(\phi_d) = 1 - \left( \frac{\tan(\phi_d - \theta(\phi_d))}{\tan(\phi_d + \theta(\phi_d))} \right)^2$$

for light with its polarization axis parallel to the photodetector surface, where:

$$\theta(\phi_d) = \arcsin \left( \frac{n_d}{n_o} \cdot \sin(\phi_d) \right)$$

where $n_d$ is the optical index of the photodetector. The photodetector will therefore measure the energy over the cross section of the output cone of light asymmetrically, and will not equally sample the two output polarization states of the fiber. Because of this nonuniformity in sensitivity a photodetector angled with respect to the light exiting the readout fiber cannot be used to spatially average a sensors optical output.

This invention utilizes a short coherence length source combined with an adequate length of birefringent media just prior to the photodetector to decorrelate the polarization modes of the output light substantially eliminating interference between the modes at the photodetector thus eliminating any need for spatial averaging and allowing the use of photodetector angled respect to the light exiting the fiber.

In operation the present invention may be more fully understood in conjunction with the following discussion.

If optical cross talk occurs at any point in a fiber sensor system. Light coupled from one optical axis of the fiber into the other will begin to lag or lead the original light due to the birefringence of the fiber. For example, if the light was originally in the slow axis, any light coupled into the fiber fast axis will begin to lead the original light by:

$$\Delta L = B \cdot L$$

where $\Delta L$ is the difference in length traveled by the slow and the fast axis light, B is the fiber birefringence, and L is the length the light has traveled in the fiber (the optical path length is nL where n is the index of the fiber). The fiber birefringence is approximately related to the beat length of the fiber (ignoring the weak dependence of the birefringence on wavelength) by:

$$B \approx \frac{\lambda_B}{nL_B}$$

where $L_B$ is the fiber beat length and $\lambda_B$ is the wavelength at which the beat length was measured. Fiber manufacturers often specify a fiber's beat length instead of its birefringence.

Although the two modes are orthogonol in the fiber, once the light leaves the fiber the modes can locally interfere, at for instance a photodetector, causing variations in intensity over the surface of the detector. If all the light, from both polarization states, is averaged evenly over the cone of light emitted by the fiber these intensity variations will sum to zero. If however, the light is not sampled evenly, or if the polarization states are sampled with different efficiencies, some potential for interference remains. This residual interference will cause errors in the output of the gyro.

Interference can only occur if the portions of light traveling in the two fiber axes are at least partially coherent with respect to each other. Two samples of light emitted from a source will tend to interfere if the difference between the optical path lengths is less than $L_{CO}$. Where $L_{CO}$ is the free space coherence length of the source given by:

$$L_{CO} = \frac{\lambda^2}{\Delta \lambda}$$

where N is the wavelength of the source and $\lambda \Delta$ is the full width half maximum linewidth of the source. At differential lengths substantially longer than the coherence length no significant interference will occur. In fiber of index n, the effective coherence length is reduced. We may write the coherence length in the fiber as:

$$L_c = \frac{L_{CO}}{n}$$

Where $L_c$ is the physical differential length traveled through a media with optical index n (not the optical path length LC0). In a fiber with birefringence B the differential path length between the fast and slow fiber birefringence axes is given by:

$$\Delta = B \cdot L$$

To ensure that the two fiber modes are not coherent with respect to one another we have the following requirement:

$$\Delta L > L_c$$

For a fiber of birefringence B, the distance light must travel to decorrelate the two fiber modes is given by:

$$L_f \gg \frac{L_c}{B}$$

If written in terms of the source parameters, the requirement becomes:

$$L_f \gg \frac{\lambda^2}{n \cdot B \cdot \Delta\lambda}$$

From the above analysis we have the requirements for avoiding interference, between the fiber birefringence modes, at the photodetector.

In the preferred embodiment of this invention a 840 nm wavelength superluminescent diode is used as a light source. Superluminescent diodes such as those manufactured by EG&G have typical linewidths of over 26 nm. A polarization maintaining fiber is used as the birefringent media just prior to the photodetector to decorrelate the polarization modes of the sensor. One polarization maintaining fiber that may be used is FS-CP-4611 fiber manufactured by Minnesota Mining and Manufacturing Company which is used in the leads of their optical couplers. The FS-CP-4611 fiber has a typical birefringence of $2.0 \times 10^{-4}$. This is lower than many polarization maintaining fibers but is still adequate to produce a reasonable requirement that the lead length $L_f$ be many times longer than a length of 9.3 cm when used with the above mentioned superluminescent diode. This requirement is easily met by a typical coupler lead length of 1 to 1.5 meters.

Figure 3:
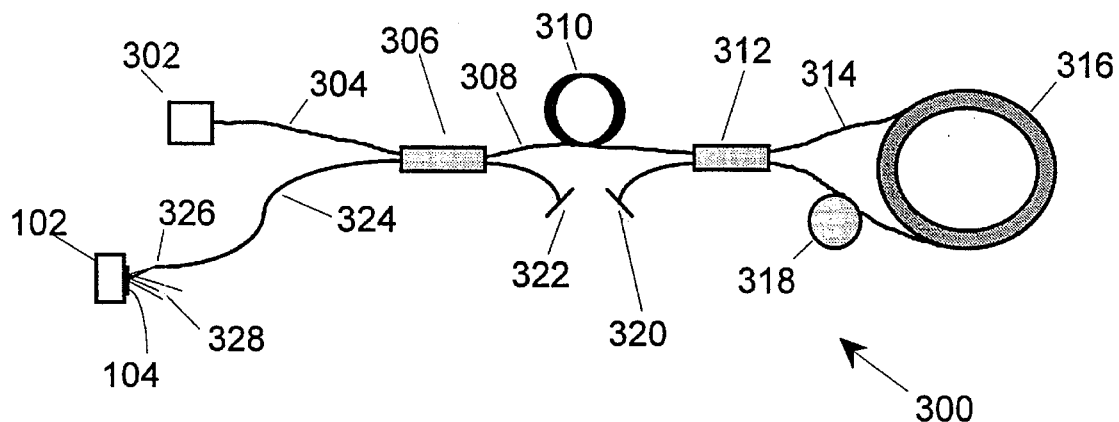
FIG. 3 is a schematic representation of a FOG, of the present invention, showing the light source and the readout photodetector skewed with respect to the light exiting the readout optical fiber.

Now referring to FIG. 3, there is shown a FOG, of the present invention, generally designated 300 having a light source 302 with a optical fiber 304 extending to input/output coupler 306. Extending from coupler 306 is fiber 308 which extends to fiber polarizer 310 which is preferably a loop of birefringent single-polarization optical fiber and extends to loop coupler 312. Extending from loop coupler 312 is optical fiber 314 which is wound into a quadrupolar fiber coil 316 which is coupled to piezoelectric phase modulator 318 (optional) and back to loop coupler 312. Loop coupler 312 and input/output coupler 306 are shown having low-back-reflection optical terminations 320 and 322 disposed respectively thereon. Extending from input/output coupler 306 is low-cross-talk birefringent readout optical fiber 324 which has a cleaved end 326 which is preferably a 15 degree angle cleaved to fiber end. Photodetector 102 having photodetector face 104 is shown disposed at a non-normal angle with respect to the optical output of the optical output of the readout optical fiber 324. Reflections 328 off of the photodetector face 104 are shown exiting in a direction away from the optical fiber 324.

The light source 302 is preferably a superluminescent diode such as those manufactured by EG&G. A typical wavelength of such source may be 840 nm with linewidths of over 26 nm. The birefringent fibers 304, 308, 310, 314, and 316 are well known in the prior art. The optional piezoelectric phase modulator consists of piezoceramic disc or cylinder wrapped with birefringent polarization-maintaining fiber. A voltage applied to this piezoelectric element causes it to expand or contract resulting in a change in the length of the wrapped fiber and an attendant change in the optical propagation time through the modulator. By applying a voltage modulation to a phase modulator located near one end of a FOG's fiber coil an effectively non-reciprocal optical phase modulation is applied to the light traversing the fiber coil producing an optical output at the readout photodetector sensitive to both the magnitude and direction of the FOGs rotation. The techniques for utilizing such a piezoelectric phase modulator to produce a usable modulation in the gyros optical output, and techniques to convert this output to a measure of the FOG's rotation rate are well known in the prior art. Input/output coupler 306 is preferably a 50/50 optical coupler which is also well known in the art. Loop coupler 312 is preferably a low-optical-cross-talk coupler in which the birefringence axes of the coupled fibers are aligned to give low polarization cross talk in the light coupled to the second coupler output. Readout optical fiber 324 may be a birefringent lead of the input/output coupler 306. One possible coupler is manufactured by Minn. Mining and Manufacturing Company (3M) of St. Paul, Minn. which use FS-CP-4611 fiber which has a typical birefringence of $2.0 \times 10^{-4}$. Because the light in the two polarization modes of the fiber will be decorrelated before detection light may be coupled into either or both of the output fiber birefringence axes, so the birefringence axes of the input/output coupler need not be aligned. This reduces the manufacturing cost of this coupler. Decorrelation of the output polarization modes is preferably achieved in a coupler lead 324 of over 1 m in length. Preferably this coupler lead also has a soft inner layer jacket that reduces stress to the fiber. The lead must be packaged in such a way as to prevent external stress such as pinching, or sharp bending or twisting. The fiber may be loosely packaged to prevent stress or embedded in a soft material such as High Gel available from 3M for maintaining stability in vibration. When a fiber is packaged in this way, the coupler lead meets both requirements for polarization decorrelation and the low-polarization-cross-talk. To prevent coupling of reflective light back into the output fiber, the photodetector 102 must be positioned at a sufficient angle to the light leaving the cleaved fiber end 326 such that none of the cone of light reflected by the photodetector face 104 falls back onto the fiber 324.

Figure 4:
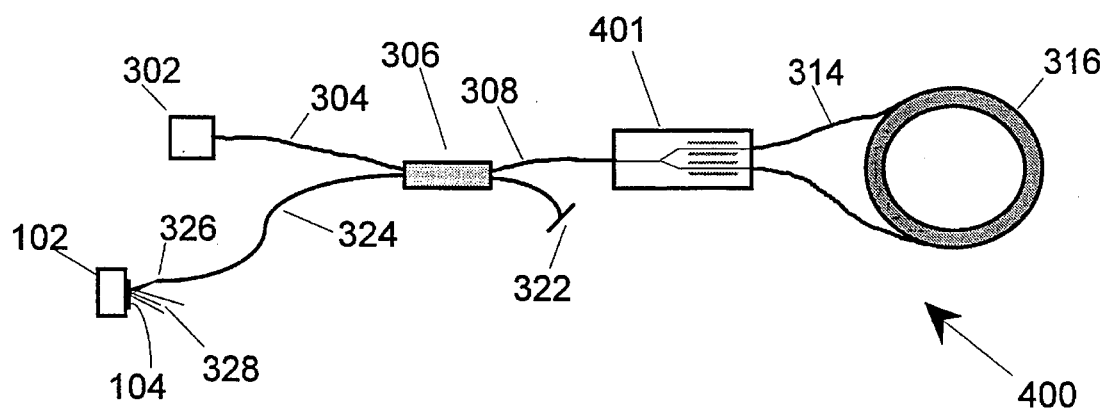
FIG. 4 is a schematic representation of an alternate design for a FOG of the present invention, utilizing an integrated optics chip and also showing the readout photodetector skewed with respect to the light exiting the readout optical fiber.

Now referring to FIG. 4, there is shown a second FOG embodiment of the invention, generally designated 400, utilizing an integrated optic chip (IOC) (401) such as those sold by United Technologies Photonics. The IOC in FIG. 4 serves the same function as the polarizer, loop coupler, and phase modulator shown in FIG. 3. IOCs generally have significantly wider optical modulation bandwidths allowing more advanced modulation schemes to be employed such as those that null the rotation rate induced optical phase shift in a closed loop manor to minimize output errors such as a scale factor nonlinearities. The advantages of utilizing IOCs and advanced optical modulation techniques in FOGs and other optical sensors are well known in the prior art.

Figure 5:
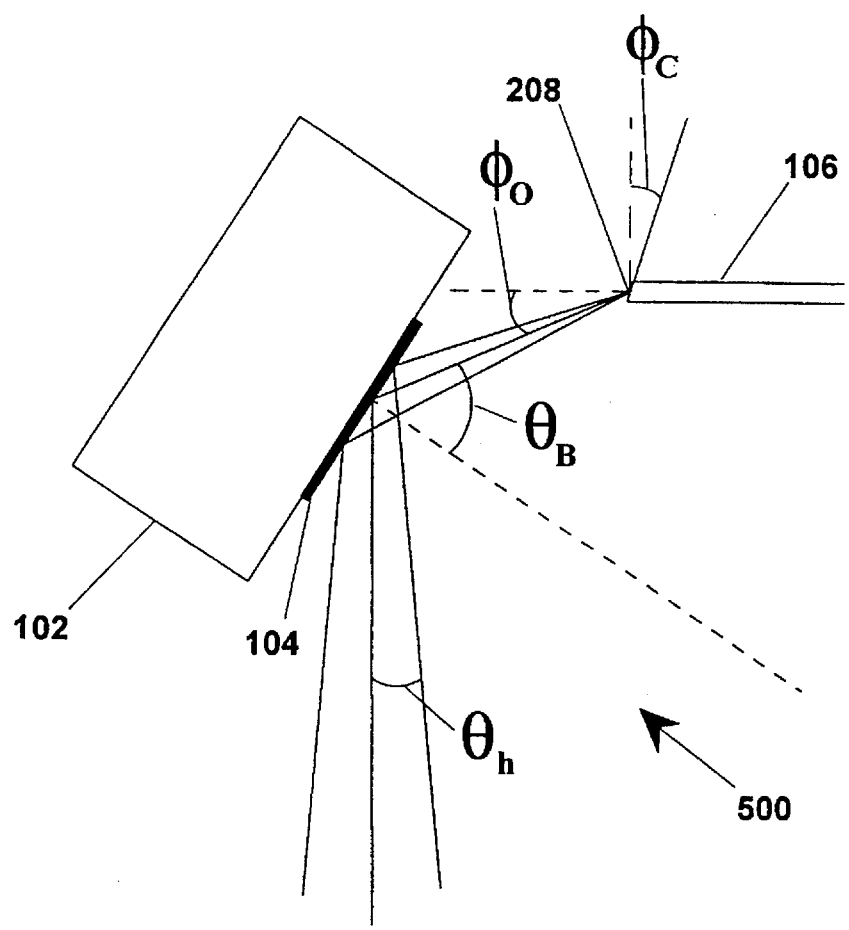
FIG. 5 is a representation of the readout photodetector/ optical fiber combination, of the present invention, which shows the photodetector mounted at such an angle that the readout light nominally strikes the photodetector face at Brewster's angle to maximize coupling of a polarized output.

Now referring to FIG. 5, there is shown a second FOG readout, of the present invention, generally designated 500, having a readout photodetector 102 with a photodetector face 104 thereon. From the expression above for the photodetector transmission coefficient $T_p(\phi_d)$ we see that if we set the angle of incidence $\phi_d$ equal to Brewster's angle $\theta_B$ given by:

$$\theta_B = \arctan\left(\frac{n}{n_o}\right)$$

that $T_p(\theta_B)$ will equal 1. So that if a sensor has an optical output which is predominately polarized, coupling to the readout detector is maximized by proper orientation of the output polarization state and by aligning the normal to the photodetector face at Brewster's angle, given above, to the sensor's optical output.

In the preferred embodiment of this invention the output face of the fiber 208 is cleaved or polished at a 15 degree angle from normal to the length of the fiber with such an orientation that the birefringence axis of the readout fiber 106 containing the predominate portion of the sensors optical output is aligned such that it lies in the plane of the figure. The photodetector is mounted at an angle $\theta_B$ of approximately 56 degrees to the centroid beam of the output cone of light. This ensures both that the predominate polarization axis is aligned with the p reflection axis of the photodetector and that the central portion of the cone of light will strike the photodetector at Brewster's angle to maximize transmission.

Preferably, the present invention includes:
1. A short coherence length with linewidth $\lambda$ and mean wavelength $\lambda$.
2. A fiber optic sensor receiving light from the source and emitting some portion of the light as an output.
3. A photodetector positioned to receive some of the output from the sensor.

A low-optical-cross-talk, birefringent media, with sufficient length to decorrelate the two polarization modes emitted by the sensor, interposed between the sensor output and the photodetector. A media having optical index n and birefringence B must be of a length $L_f$ such that:

$$L_f \gg \frac{\lambda^2}{n \cdot B \cdot \Delta\lambda}$$

Throughout the above discussion the invention has been referred to as a fiber optic gyro or FOG for clarity and to focus the discussions. It should be obvious that the above method for simultaneously reducing readout backreflections and spatial interference at the output may be applied to any optical interferometric sensor such as hydrophones, magnetic field sensors, or position sensors.

It is thought that the FOG, of the present invention, and many of its attendant advantages will be understood from the foregoing description and it will be apparent that various changes may be made in the form, the construction and arrangement of the parts thereof without departing from the spirit and scope of the invention or sacrificing all of their material advantages. The form herein being described is merely a preferred or exemplary embodiment thereof.

I claim:

1. An apparatus comprising:

a sensor having an optical input and an optical output;

a light source having a predetermined coherence length optically coupled to said optical input;

a light receiver optically coupled to said optical output such that reflections into the sensor are minimized;

a birefringent media interposed between said optical output and said light receiver; and, said predetermined coherence length being shorter than a difference in two optical path lengths in said birefringent media;

whereby, optical interference at the light receiver is reduced by decorrelation of polarization states of the birefringent media and concomitantly coupling of reflections from the light receiver means into the sensor are reduced.

2. A fiber optic gyroscope comprising:

a light source having a predetermined coherence length;

an input/output optical coupler, coupled to said light source;

a fiber coil, coupled to said input/output coupler;

a birefringent readout optical fiber having a predetermined birefringence, coupled to said input/output coupler;

a photodetector oriented at a non-normal angle with respect to an optical output of said birefringent readout optical fiber, optically coupled to said birefringent readout optical fiber, so that, light eminating from said birefringent readout optical fiber strikes said photodetector and is reflected away from said birefringent readout optical fiber; and, said predetermined coherence length being shorter than a difference in optical path lengths between both polarization states in the birefringent readout optical fiber;

whereby, optical interference at the photodetector is reduced by decorrelation of polarization states in the birefringent readout optical fiber and concomitantly reflections off the photodetector into the birefringent readout optical fiber are reduced.

3. A fiber optic gyroscope comprising:

a light source having a predetermined coherence length;

an optical coupler, coupled to said light source;

a fiber coil, coupled to said optical coupler;

a birefringent media, having first and second optical path lengths there through, coupled to said optical coupler;

said predetermined coherence length being shorter than a difference between said first and second optical path lengths;

a light receiver coupled to said birefringent media, so that, light eminating from said birefringent media strikes said light receiver and is reflected away from said birefringent media, and, the birefringent media and the light receiver are configured so as light emitting from the birefringent media is incidence upon the light receiver at a nonperpendicular angle;

whereby, optical interference at the light receiver is reduced by decorrelation of polarization states in the birefringent media and concometly reflections off the light receiver into the birefringent media are reduced.

4. An optical interferometer comprising:

a light source;

an optical coupler, coupled to said light source;

a fiber coupled to said optical coupler;

a readout device coupled to said optical coupler; and a light receiver coupled to said readout device such that light emitting from said readout device is incidence upon the light receiver at a nonnormal angle;

wherein the nonnormal angle is Brewster's Angle;

whereby reflections from the light receiver into the readout device are reduced.

5. A fiber optic gyroscope comprising:

a light source having a predetermined coherence length;

an optical coupler, coupled to said light source;

a fiber coil, coupled to said optical coupler;

a birefringent readout optical fiber having a predetermined birefringence, and a first optical path length there through and a second optical path length there through, coupled to said optical coupler;

a photodetector oriented at Brewster's Angle with respect to an optical output of said birefringent readout optical fiber, said photodetector optically coupled to said birefringent readout optical fiber, so that, light eminating from said birefringent readout optical fiber strikes said photodetector and is reflected away from said birefringent readout optical fiber; and, said predetermined coherence length being shorter than a difference in the first optical path length and the second optical path length in the birefringent readout optical fiber;

whereby, optical interference at the photodetector is reduced by decorrelation of polarization states in the birefringent readout optical fiber and reflections off the photodetector into the birefringent readout optical fiber are reduced by the orientation thereof.

6. An optical interferometer comprising:

a light source having a predetermined coherence length;

an optical coupler, coupled to said light source;

a fiber coil, coupled to said optical coupler;

a birefringent media, having first and second optical path lengths there through, coupled to said optical coupler;

said predetermined coherence length being shorter than a difference between said first and second optical path lengths;

a light receiver coupled to said birefringent media, so that, light eminating from said birefringent media strikes said light receiver and is reflected away from said birefringent media;

the birefringent media and the light receiver are configured so as light emitting from the birefringent media is incidence upon the light receiver at a nonperpendicular angle; and, said nonperpendicular angle is Brewster's Angle;

whereby, optical interference at the light receiver is reduced by decorrelation of polarization states in the birefringent media and concometly reflections off the light receiver into the birefringent media are reduced.

* * * * *